US006637030B1

(12) United States Patent
Klein

(10) Patent No.: US 6,637,030 B1
(45) Date of Patent: Oct. 21, 2003

(54) BROADBAND CABLE TELEVISION AND COMPUTER NETWORK

(75) Inventor: Dean A. Klein, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 08/872,010

(22) Filed: Jun. 10, 1997

Related U.S. Application Data

(62) Division of application No. 08/840,083, filed on Apr. 9, 1997.

(51) Int. Cl.[7] ................................................. H04N 7/18
(52) U.S. Cl. ............................ 725/78; 725/74; 725/83
(58) Field of Search ............................ 348/8, 6, 7, 12, 348/13; 455/6.3, 4.2, 5.1, 464, 60; 725/74, 78, 79, 83; H04N 7/10, 7/14; H04W 7/14

(56) References Cited

U.S. PATENT DOCUMENTS

| | | | | |
|---|---|---|---|---|
| 5,185,762 A | * | 2/1993 | Schilling | 375/1 |
| 5,396,359 A | * | 3/1995 | Abramovitz | 359/127 |
| 5,408,500 A | * | 4/1995 | Ginzburg et al. | 375/288 |
| 5,517,487 A | * | 5/1996 | Fridland et al. | 370/5 |
| 5,539,880 A | * | 7/1996 | Lakhani | 348/12 |
| 5,559,625 A | * | 9/1996 | Smith et al. | 359/125 |
| 5,565,910 A | * | 10/1996 | Rowse et al. | 370/62 |
| 5,585,837 A | * | 12/1996 | Nixon | 348/6 |
| 5,625,863 A | * | 4/1997 | Abraham | 455/3.3 |
| 5,760,822 A | * | 6/1998 | Coutinho | 725/126 |
| 5,805,806 A | * | 9/1998 | McArthur | 395/200.8 |
| 6,009,465 A | * | 12/1999 | Decker et al. | 709/219 |
| 6,288,749 B1 | * | 9/2001 | Freadman | 725/74 |

\* cited by examiner

Primary Examiner—Vivek Srivastava
(74) Attorney, Agent, or Firm—Knobbe, Martens, Olson & Bear, LLP

(57) ABSTRACT

A communication system is provided which may comprise an upstream source of broadband communications and a downstream local area network, wherein the upstream source of broadband communications is coupled to the downstream local area network through a notch filter. In some embodiments, the upstream source of broadband communications may be a cable television service provider, and the local area computer network may use existing cable television wiring as communication cable.

17 Claims, 5 Drawing Sheets

BROADBAND CABLE TELEVISION AND COMPUTER NETWORK

RELATED APPLICATION

This application is a divisional of U.S. patent application Ser. No. 08/840,083, filed Apr. 9, 1997.

BACKGROUND OF THE INVENTION

Over the past several years, local area networks (LANs) have become commonplace in business and manufacturing facilities. In the residential environment, though, stand-alone computers are common, but networked personal computers (PCs) have remained relatively rare. However, as consumers rely more heavily on personal computers to telecommute, shop, and interact with the ever increasing number of on-line services, home computer networks will become more desirable. This trend may be further augmented by the development of "smart" appliances, alarm systems, etc., which may be controlled by a home computer system. In addition, "network computers" (NCs), which are inexpensive networked terminals without significant local memory or magnetic storage media have recently been introduced. These devices will make available inexpensive means of accessing data and programs on a remote personal computer, thereby reducing the investment in hardware necessary to create a home computer network.

Although the utility of home computers is increasing, and the cost of network hardware is decreasing, another major expense in the creation of such a home computer network resides in outfitting the home with network cabling to interconnect the desired PCs, NCs, appliances, and other network compatible devices. This expense, of course, is not affected by reductions in the price of the computer hardware itself. The expense of installing LAN wiring is generally less of a problem when creating LANs in office buildings. In the commercial and manufacturing environment, office facilities are often pre-wired with excess telephone cable. Unused telephone cable can therefore be used to support, for example, a 10 BASET local area network. It has also become more common to pre-wire business and manufacturing facilities with the dedicated LAN communication cable necessary to support local computer networks.

New residential construction generally does not include any pre-wiring of LAN cabling, and although telephone wiring is typically routed to many rooms of the house, there is generally no excess telephone wiring which can be dedicated to use in a local computer network However, over 60% of the homes in the United States are wired for cable television reception, providing a wide-band and potentially very high capacity information pipeline into a majority of American homes. This fact is currently motivating the development of interactive communication on the cable television infrastructure. In some cable television distribution systems, downstream communication from the cable service provider is carried on 6 MHz channels in the 50–750 MHz range. Upstream communication from the customer to the cable service provider is supported on several 6 MHz channels in the 5–42 MHz range. Over these communication channels, interactive services may be provided which include analog telephone service, as well as two-way digital communication such as access to the Internet, electronic shopping, videoconferencing, and other communication services. Cable modems, commercially available, for example, as the model CyberSURFER(TM) from Motorola, are designed to implement such two way digital communication between a consumer's personal computer and the cable television service provider along the cable television line. As this trend continues to develop, consumers may connect more digital computing devices to their cable television wiring.

However, the use of this CATV wiring to support a local area network has not been previously accomplished As is described in detail in U.S. Pat. No. 5,255,267 to Hansen et al., it is possible to inject broadband video channels onto LAN cabling carrying thin Ethernet baseband communications. However, this requires that baseband signal energy at frequencies up to 25 MHz be blocked from entering the broadband video feed by a high pass filter. This filtering eliminates the possibility of sending upstream messages from the home to the cable service provider at, for instance, the 5 to 11 Mhz upstream channel currently supported by cable television service providers. Furthermore, typical baseband transceivers are designed to operate with twisted pair cable or 50 ohm coaxial lines, not the 75 ohm coaxial cable pre-installed in homes and used for cable television delivery.

The creation of a home personal computer network has thus entailed a significant amount of cable routing through interior walls of the household, which is a time consuming and expensive procedure. What is needed therefore, is a system and method of creating a home personal computer network without the necessity of installing dedicated network cabling.

SUMMARY OF THE INVENTION

In one embodiment, the present invention includes a communication system comprising an upstream source of broadband communications and a downstream local area network. The upstream source of broadband communications is coupled to the downstream local area network through a notch filter. Other embodiments of the present invention include a local-area-network of computing devices comprising a notch filter comprising a first port and a second port, wherein the first port is coupled to a first cable and the second port is coupled to a second cable. In addition, the first port comprises an input port for signals carried by the first cable, and the second port comprises an output port coupling notch filtered signals to the second cable. A plurality of computing devices are coupled to the second cable.

The invention also comprises methods of interconnecting computing devices. One method comprises receiving a signal comprising a plurality of cable television channels from a first coaxial cable, filtering out a portion of that signal to produce a filtered signal, and coupling the filtered signal to pre-installed cable television wiring. A plurality of computing devices are coupled to the pre-installed cable television wiring, which then communicate messages by modulating a carrier having a frequency within the filtered out portion.

A notch filter comprising a first port adapted for connection to a video distribution system and a second port adapted for connection to a local-area-network are also provided by the invention, as are new computing devices. Such computing devices may comprise first and second receivers, each configured to receive a broadband signal in the frequency band from approximately 50 to 750 MHz. Also, the computing devices may comprise first and second transmitters, wherein the first transmitter is configured to transmit a broadband signal in the frequency band from approximately 5 to 42 MHz, and the second transmitter is coupled to transmit a broadband signal in the frequency band from approximately 50 to 750 MHz.

DETAILED DESCRIPTION OF THE INVENTION

Embodiments of the invention will now be described with reference to the accompanying FIGS., wherein like numerals refer to like elements throughout. The terminology used in the description is intended to be interpreted in its broadest reasonable manner, even though it is being utilized in conjunction with a detailed description of certain specific embodiments of the invention. This is further emphasized below with respect to some particular terms used herein Any terminology intended to be interpreted by the reader in any restricted manner will be overtly and specifically defined as such in this specification.

Figure 1:
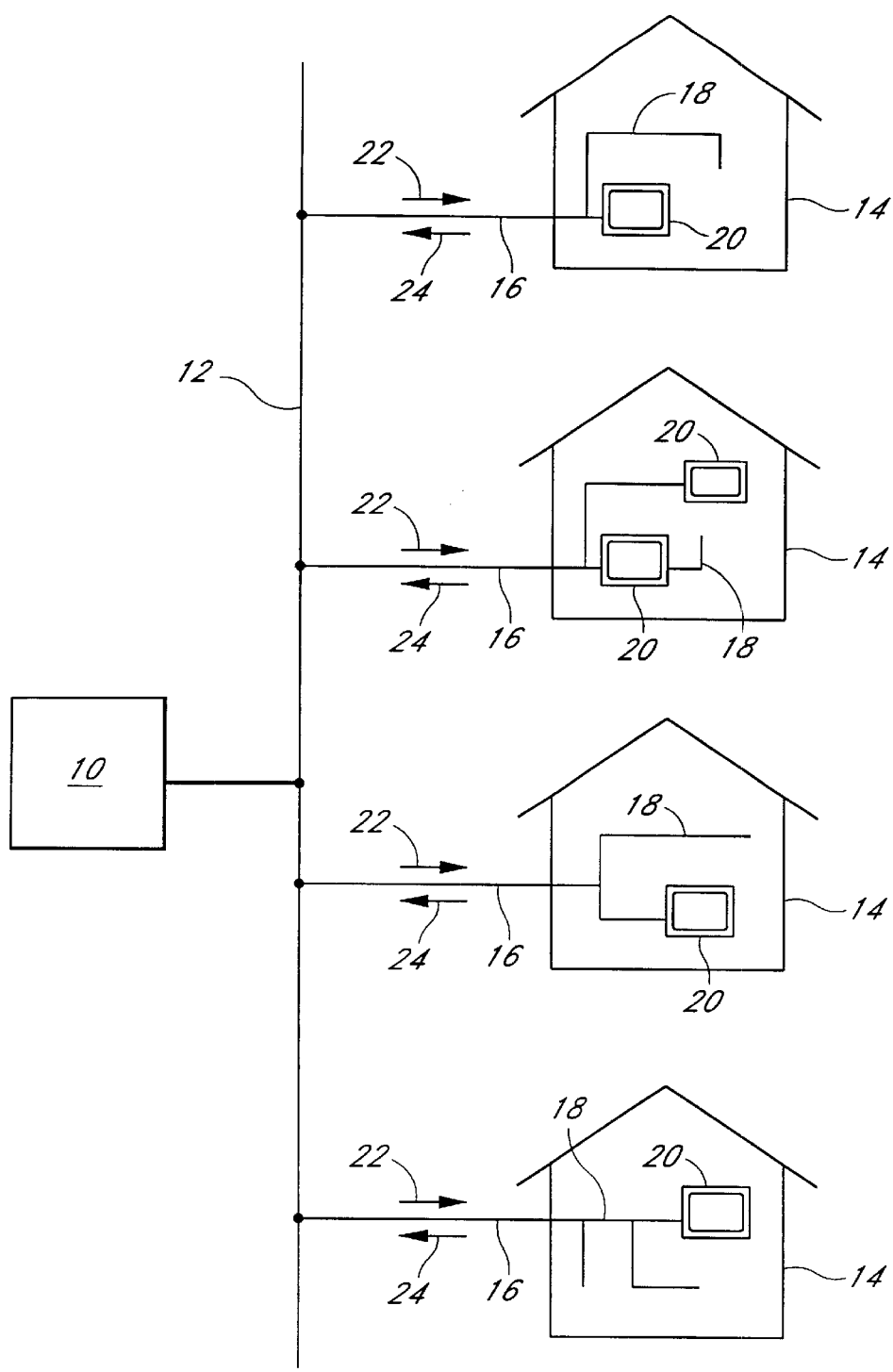
FIG. 1 is a block diagram illustrating the basic components of a cable television distribution system.

As discussed above, one expense involved in the establishment of a local-area-network of computing devices is the provision of suitable interconnecting wiring. One aspect of the present invention mitigates this expense by using existing "community antenna television" wiring (or "CATV" or cable television wiring) within a structure to support not only cable television reception, but also network communications between computing devices within the structure. Referring now to FIG. 1, a cable distribution system comprising headend transmission equipment 10 operated by the cable television service provider is illustrated. As is known in the art, the "headend" of the cable transmission system is the point where UHF/VHF/FM and/or satellite television signals are fed into the system. The headend 10 is coupled to a distribution cable 12 that runs on a pole or underground through a neighborhood which receives cable television service. The individual residences 14 each receive the television signal, which may of course comprise both video and audio signals, from the distribution cable 12 via service drops 16.

The service drops 16 typically comprise 75 ohm coaxial cable, and extend onto the premises as a 75 ohm coaxial cable bus or tree configuration 18 internal to each residence 14. The on-premises cabling 18 is generally routed to several rooms of the residence 14, including the living and family rooms, as well as the bedrooms, where it is connected to one or more television receivers 20.

Initially, cable television service included only communication of television channels in a downstream path 22 to subscribers. Currently, downstream communication is accomplished in the frequency band between approximately 50 and 750 MHz. This provides sufficient bandwidth for dozens of television channels, each occupying a 6 MHz wide portion of the spectrum. Furthermore, spectral efficiency can be improved by a factor of about three with the implementation of currently available digital transmission techniques, so that delivery of hundreds of television channels can be expected in the future.

Many cable distribution systems have now been configured to also support upstream communication to the cable television service provider. This upstream communication path 24 has typically been performed on the frequency band between approximately 5 and 42 MHz, comprising a bandwidth of approximately six standard television channels. One use of this upstream communication capacity is the consumer issuance of pay-per-view signals to the cable service provider. This communication occurs generally in an upstream band from approximately 5 to 11 MHz. As will be explained below, it is one aspect of the present invention that the on-premises cabling 18 can be used to support a local area computer network in addition to cable television service by utilizing a portion of the downstream spectral bandwidth 22 for LAN communication. Using the methods and apparatus of the present invention, this is accomplished without interfering with the upstream communication path 24.

Figure 2:
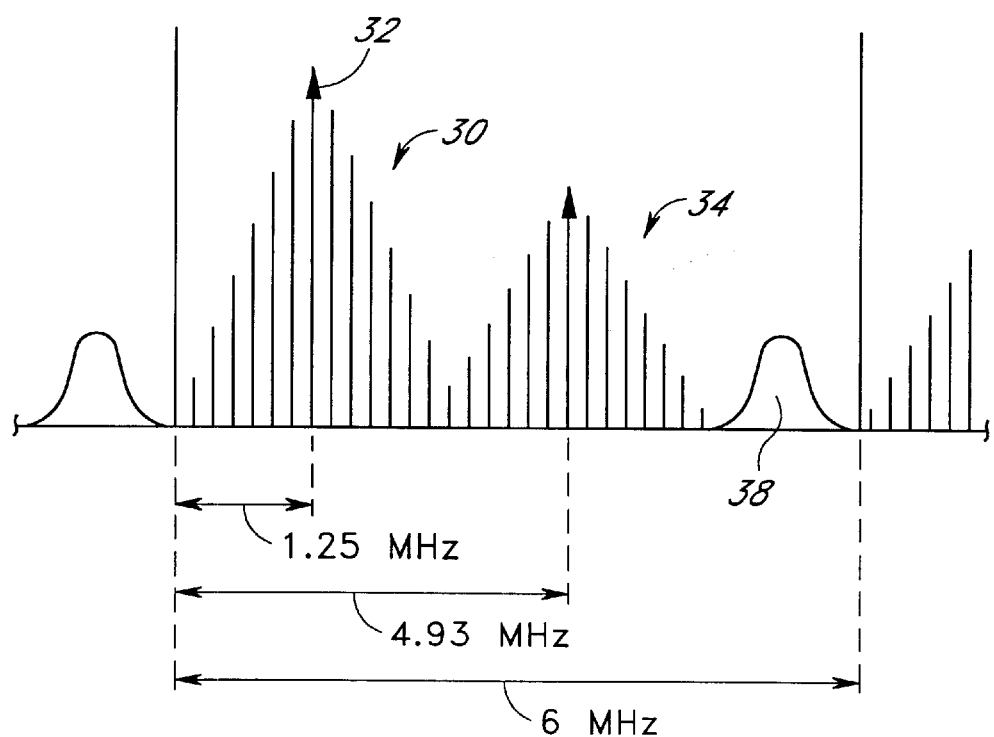
FIG. 2 is a graphical representation of the signals comprising a standard 6 MHz broadcast or cable television channel.

The downstream bandwidth of 50 to 750 MHz is partitioned into several 6 MHz wide channels which are grouped into sets of adjacent channels with unused bands provided between different channel sets. One such channel is illustrated in FIG. 2. The television signal comprises a luminance signal 30 modulated onto a carrier 32 which is 1.25 MHz above the lower band edge. A chrominance signal 34 is transmitted on a sub-carrier at about 3.58 MHz above the luminance carrier 32. Finally, an FM modulated audio signal 38 is provided on a carrier at about 4.5 Mhz above the luminance carrier 32. Adjacent luminance carriers 32 are assigned to frequencies which are spaced 6 MHz apart, thereby creating frequency division multiplexed channels of 6 MHz width. Almost all of the energy transmitted for a given channel is confined to the 6 MHz channel width to eliminate unacceptable adjacent channel interference.

With a downstream bandwidth of approximately 700 MHz it can be appreciated that a very large number of 6 MHz wide channels can be supportd which number will only increase with the implementation of digital television transmission. It can therefore also be appreciated that in any given residence, many of these available channels will be either (1) unprogrammed by the cable service provider, (2) comprise premium channels to which the consumer does not subscribe, or (3) be channels which are simply not watched to an appreciable extent. Thus, a significant amount of available spectrum is not efficiently utilized.

Figure 3:
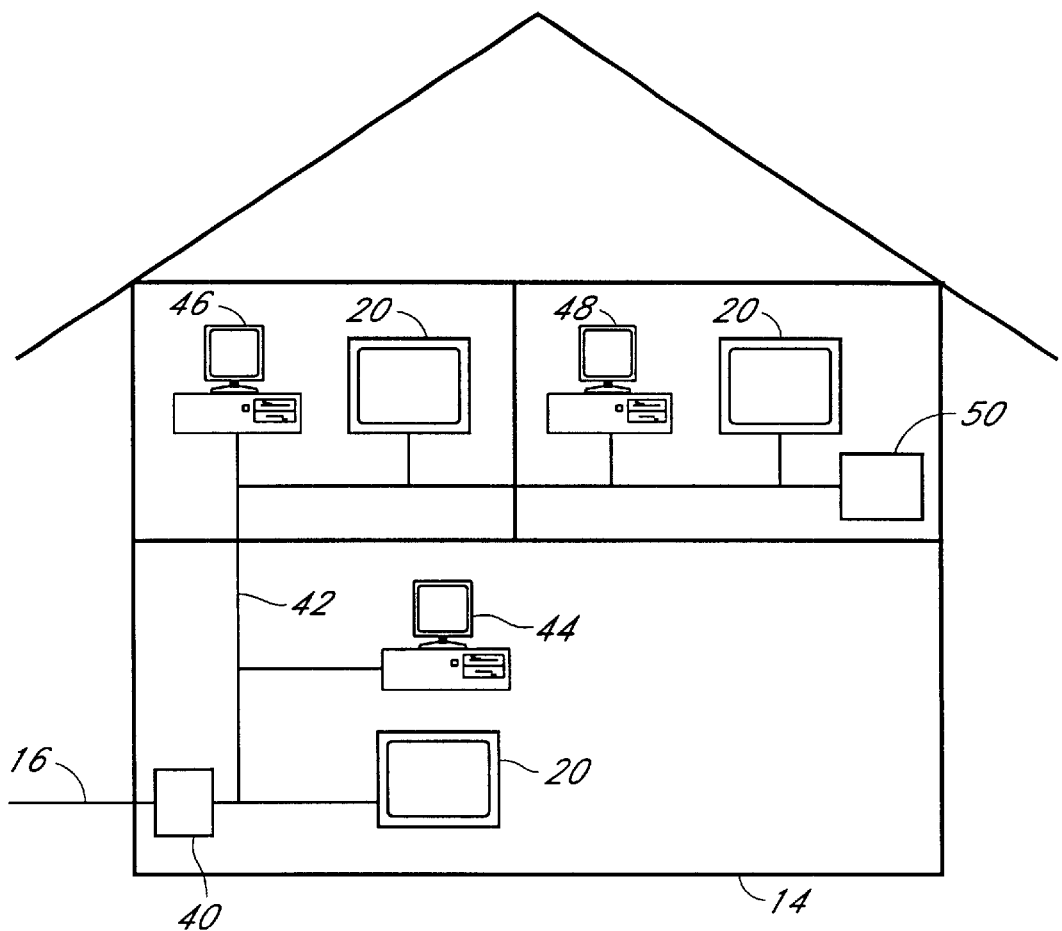
FIG. 3 is a system level block diagram of a LAN implemented on cable television wiring inside a residence.

Referring now to FIG. 3, a residence 14 is shown which illustrates the implementation of a LAN that communicates over this under-utilized bandwidth on the cable television infrastructure. As was described with reference to FIG. 1, the residence 14 is supplied with cable television service via a service drop 16 which supplies cable television signals to a bus or tree configuration of on-premises 75 ohm coaxial cable. Preferably, the service drop 16 passes through a notch filter 40 which isolates a segment 42 of the service drop from selected frequency bands which are defined by the stop bands of the notch filter 40. In some configurations, the isolated segment 42 has been wired to several rooms of the residence to supply cable television to those areas of the household where television reception may be desired. More specific characteristics of the isolation provided by the notch filter are described in more detail below with reference to FIG. 4. Briefly, the notch filter 40 effectively blocks selected bands of frequencies within the total 50 to 750 MHz downstream bandwidth from entering the residence in the downstream direction. The notch filter 40 also prevents upstream transmission out of the residence 14 in the same selected band. As is set forth in detail below, the notch filter clear a portion of the downstream spectrum for use as LAN bandwidth The notch filter also helps ensure privacy of network communication because LAN signals are blocked from exiting the residence and being coupled to the cable television distribution network The notch filter 40 may comprise a body having two ports. One port is adapted for connection to a video distribution system through, for example, a service drop 16. The second port is adapted for connection to a local-area-network through, for example, a segment of cable 42 inside a residence, as will be described in more detail below. It can be appreciated that a notch filter circuit, or two or more notch filter circuits, may be incorporated into other electronic devices currently used in communication systems such as cable distribution amplifiers; splitters, set-top converters, or even cable ready television sets. In these cases, of course, the device may include additional ports adapted for connection to other pieces of equipment Inside the residence 14, several television receivers may be coupled to the isolated segment 42 of the cable television wiring. The television receivers 20 may include upstream transmitters which operate in the 5 to 42 MHz upstream channels for the transmission of pay-per-view or other signals supported by the cable television service provider. Also coupled to the isolated segment of cable television wiring are a plurality of computing devices 44, 46, and 48. Although illustrated as PCs in FIG. 3, it can be appreciated that these computing devices 44, 46, 48 can be of many different types, including network computers, microprocessor controlled appliances, alarm systems, and the like. Because one or more bands of frequencies have been notched out of the cable wiring 42 by the notch filter 40, the computing devices 44, 46, and 48 can communicate in the notched out bands using known LAN configurations described below.

LAN physical layers can be broadly grouped into two different classes: baseband and broadband. A baseband network transmits data as alternating positive and negative voltage levels on the LAN interconnecting cable. A broadband network encodes data as phase, amplitude, and/or frequency shifts onto a sine wave carrier. Industry standard physical layers of both types have been defined in two standards promulgated by Institute of Electrical and Electronic Engineers (IEEE). These standards are set forth in ANSI/IEEE 802.3, 1996 Edition and IEEE 802.4-1990, which publications are well known to those of skill in the arts These two IEEE standards we hereby incorporated by reference in their entirety.

Baseband communication between the computing devices 44, 46, 48 includes serious disadvantages because of the desire to preserve the availability of the 5 to 42 MHz band for upstream communications to the cable service provider. Accordingly, the residence computing devices 44, 46, 48 may utilize broadband communication. This is compatible with the pre-installed 75 ohm coaxial cable, and also allows signal energy to be contained within the bands of frequencies notched out by the filter 40. Furthermore, this configuration prevents LAN interference with those downstream cable television channels which are not notched out by the filter 40, and also prevents interference with upstream communications in the 5 to 42 MHz band. Specific LAN physical layers which may be implemented include the 10BROAD36 configuration defined in IEEE 802.3 and the broadband token passing networks defined in IEEE 802.4. Device interface hardware for establishing communication over these broadband networks is well known to those of skill in the art.

The broadband LAN of FIG. 3 may be a single cable configuration utilizing two frequency bands for communication, as only a single cable is generally strung within the residence to distribute cable television signals. In such single cable broadband networks, the networked devices receive data at one carrier frequency and transmit data at a second carrier frequency. Accordingly, the LAN of FIG. 3 may include a headend frequency converter 50. This device receives inbound communications from each device 44, 46, 48, in a first frequency band, and converts them to outbound communications in a second frequency band which are received by the computing devices. It is, of course, preferred for both transmit and receive frequency bands to be within notched out frequency bands created by the notch filter 40.

Figure 4:
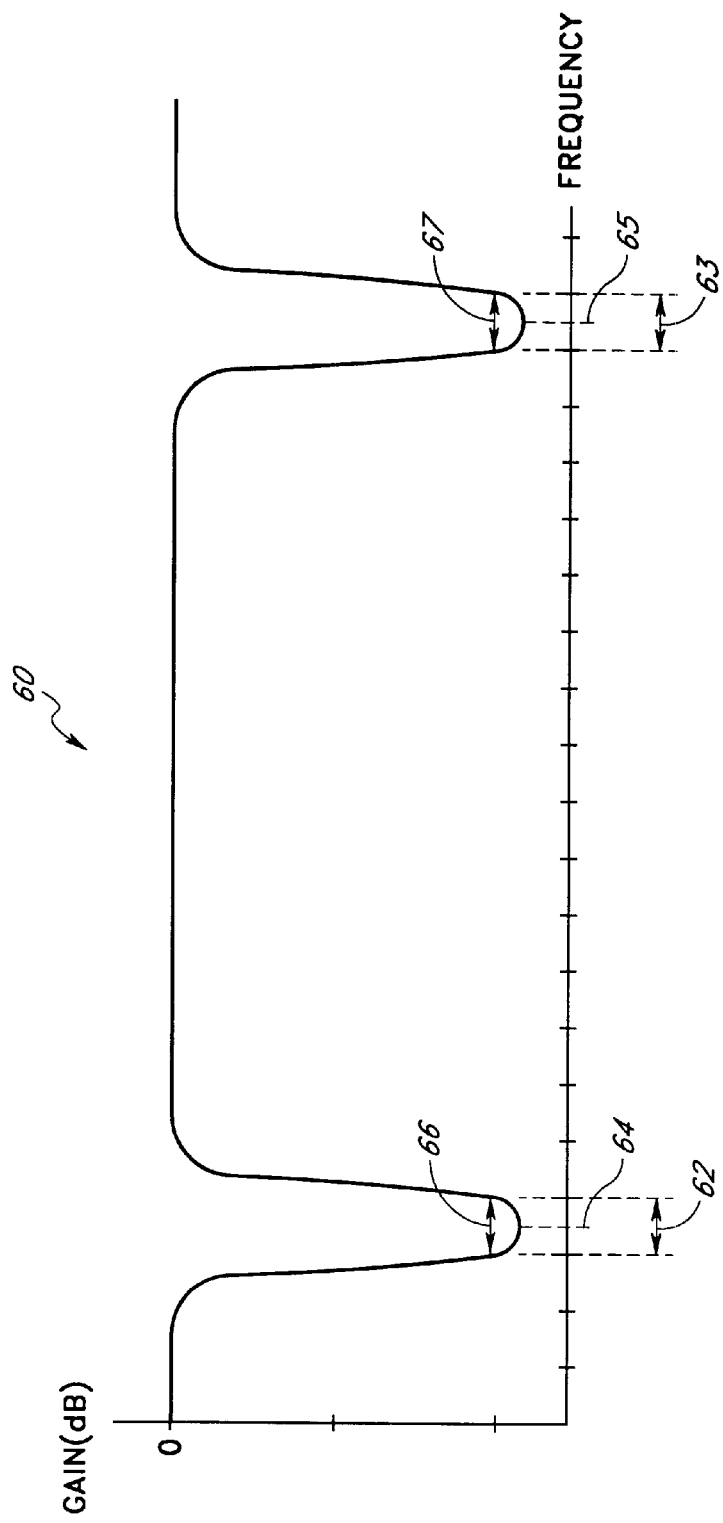
FIG. 4 is a graphical representation of the signal attenuation produced by the notch filter of FIG. 3.

Referring now to FIG. 4, the characteristics of the notch filter 40 will be described. The notch filter 40 may be of active or passive configuration, and may further be made tunable. Electrically, the notch filter 40 defines a response curve 60 of gain as a function of frequency. The filter 40 may exhibit a signal attenuation which reduces the incoming cable television signal strength within two selected bands 62, 63 to below a noise floor of approximately −30 dBmV/14 ME In one embodiment, the center frequencies 64, 65 of the two bands are approximately 192.25 MHz apart, to be compatible with the transmit/receive band separation adopted in IEEE 802.3 and 802.4. It can be appreciated that deeper attenuation of the downstream signal will improve the internal broadband network signal to noise ratio.

In the above described embodiment, the attenuation is sufficient to reduce the signals within the selected bands of frequencies to at or below the maximum cable noise levels allowed by IEEE 802.3. However, signal attenuation this great may not be necessary to implement a LAN in accordance with the present invention What is important is that the attenuation be sufficient for broadband communication between the on-premises networked devices 44, 46, 48 to occur on carriers within the notch filter stop bands 62, 63 with reasonable reliability. For some broadband networks connected to some standard cable television signals, a 20 dB or greater signal attenuation provides sufficient rejection of the cable television signal to allow reliable internal broadband communication over the cable wiring 42 at carrier frequencies within the rejected bands, and in some cases, the required attenuation may be less. One possible situation where notch filter attenuation may not need to be particularly deep is where the stop bands of the notch filter reside in regions of the downstream spectrum that are not being utilized by the cable television service provider to deliver downstream signals. In this case there is no downstream signal requiring attenuation, thereby reducing the need for deep notch filter attenuation. It may be noted however that some notch filter attenuation may still be desirable to prevent excess LAN signal energy from exiting the residence and being coupled to the cable drop 16 and then to the rest of the upstream distribution system.

In the embodiment illustrated in FIG. 4, the notch filter "stop bands" 62, 63 comprise the frequency bands for which the signal level of the downstream cable television signals is reduced to at least below −30 dBmV/14 MHz noise level. In this embodiment, these frequencies are considered "rejected", and the cable on the other side of the filter 40 is considered isolated from these frequency bans. In accordance with the above discussion, however, a "stop band" does not necessarily require this level of attenuation, and the term "stop band" is not intended to be defined by specific numerical attenuation values. Rather, "stop band" is intended to denote that band of frequencies for which the attenuation of the notch filter is sufficient to allow broadband LAN communication within the stop band on cable coupled to the output of the notch filter. As used herein, such a stop band defines a band of "rejected" frequencies, and cabling coupled to the output of the notch filter is isolated from those rejected frequencies. It can be appreciated therefore that the notch filter 40 attenuation required to create a stop band will vary from system to system, and will depend on the nature of the LAN being used in the residence, the strength of the incoming cable television signal, as well as many other factors. Appropriate notch filter attenuation values may be readily determined by those of skill in the art for specific implementations of the invention.

In addition to the depth, the widths 66, 67 of the stop bands may also be variable, as well as the center frequencies 64, 65. These values may be chosen in accordance with the nature of the incoming television signal and the nature of the LAN being implemented on the output of the notch filter 40. The center frequencies 64, 65 of the stop bands may be in the cable television downstream communication band somewhere between approximately 50 and 750 MHz, with the value selected to provide minimal interference with the consumer's reception of desired cable television channels. Compatibility with IEEE 802.3 requires the stop band center frequencies to be 192.25 MHz apart, with the lower frequency band 62 being dedicated to transmission of messages by the computing devices 44, 46, 48, and with the higher frequency band 63 being dedicated to reception of message by the computing devices 44, 46, 48. In one embodiment, the transmit stop band resides from 53.75 MHz to 71.75 MHz, and the receive stop band resides from 246 to 264 MHz These bands coincide with certain transmit and receive channels for a broadband network compatible with IEEE 802.3. Of course, different carrier frequencies can be chosen, being selected to produce stop bands which attenuate only cable television channels which the user is not reluctant to lose. In some cases, it will be desirable to raise the stop band frequencies and corresponding LAN carrier frequencies because the transmit bands allocated by IEEE 802.3 reside in the Low Band (i.e. channels 2–6) of the incoming cable television service, and a consumer may prefer not to notch these particular channels out.

The widths 66, 67 of the stop band should be wide enough to accommodate the bandwidth requirements of the LAN being implemented For the embodiment discussed above, 18 MHz bandwidth (including a 4 MHz collision enforcement band) is used for each of the transmit and receive bands. Generally, bandwidth requirements decrease with decreasing desired LAN data transfer rate. A1 Mb/sec broadband LAN may require only 1–2 MHZ of bandwidth, whereas a 10 Mb/sec broadband LAN may require 12 or more MHz of bandwidth In the residential environment, 1 Mb/sec internal communication data rate may often be sufficient, and in this case, each stop band can reside entirely within a single 6 MHz cable television channel. The center frequencies 64, 65 of the stop bands may then be chosen to be approximately centrally located within downstream cable television channels. Higher sp LANs, like the 10BROAD36 of IEEE 802.3 which requires a total of 36 MHz bandwidth, will require stop band widths that reject several incoming cable television channels. In these cases, finding several unutilized or underutilized channels should not be difficult. The design and construction of notch filter circuits which produce stop band depths, widths, and center frequencies suitable for use with the present invention is well known to those of skill in the art, and the details of the notch filter 40 circuit are accordingly not father described herein.

Figure 5:
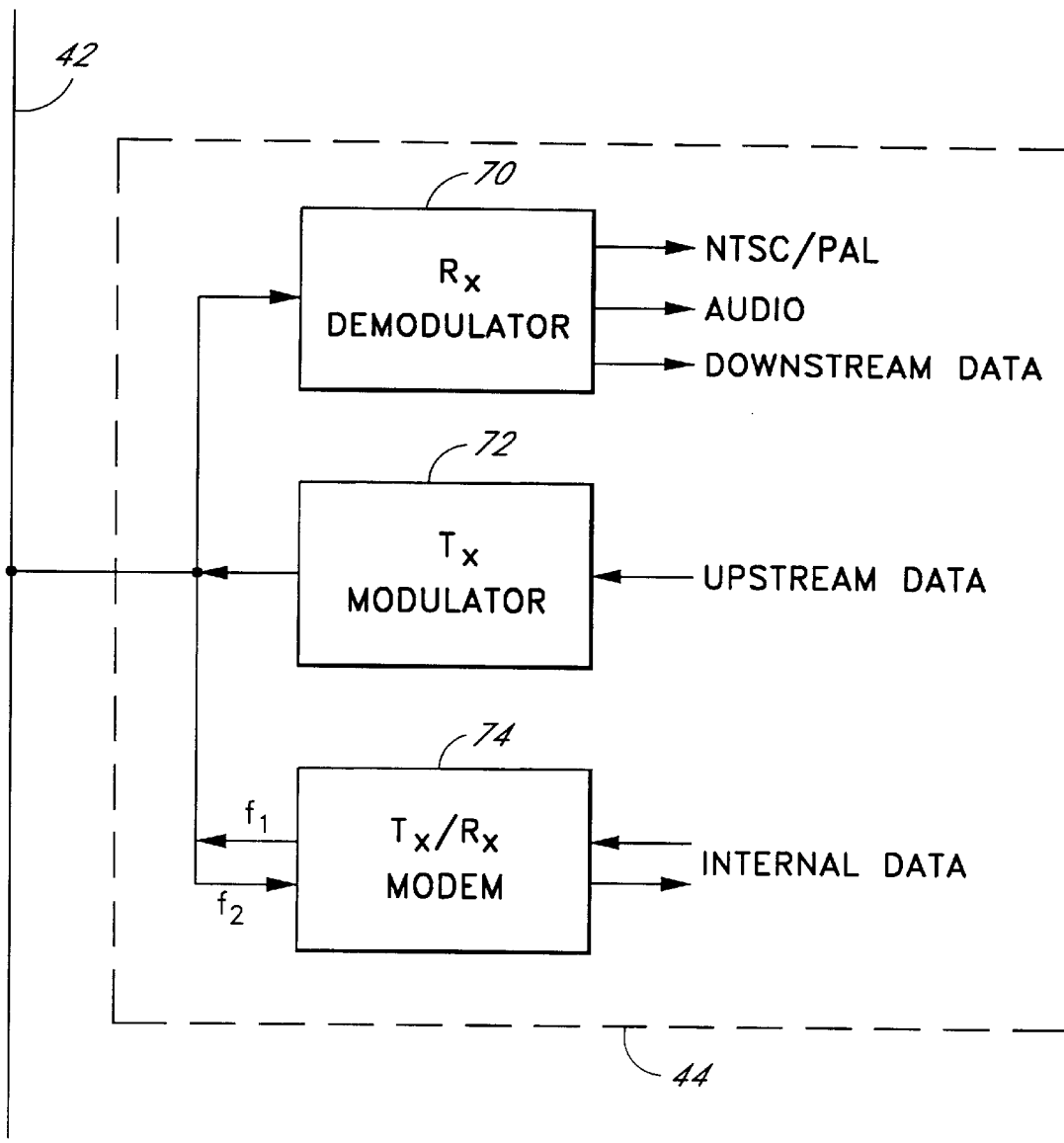
FIG. 5 is a block diagram of a preferred computing device for coupling to the LAN of FIG. 3.

To take full advantage of the communication paths of the invention, a computing device may incorporate a plurality of receivers and transmitters. Such a computing device is illustrated in FIG. 5. In this embodiment, the coaxial cable 42 is coupled to the computing device 44, and is routed to a first tunable receiver/demodulator 70 having a frequency range of approximately 50 to 750 MHz. This receiver additionally may comprise one or more demodulators for retrieving NTSC or PAL encoded video from the cable television service, FM audio signals, and also for recovering digital data from, for example, cable service provided Internet access. The computing device may also comprise a modulator and transmitter 72 coupled to the cable 42 for transmitting upstream signals to the cable television service provider. This transmitter 72 may operate in the 5 to 42 MHz band currently supported by many cable television providers. Furthermore, for on-premises communication of internal data with other computing devices within the residence, the computing device 44 additionally may comprise a dual frequency modem 74 coupled to the cable 42 for transmission and reception of broadband signals on the LAN inside the residence. The modem 74 may operate at a transmission frequency $f_1$ and a receiving frequency $f_2$ which are each within a stop band of the notch filter 40.

As with the circuitry for the notch filter 40, suitable transmitters, receivers, modulators, and demodulators for communicating as described above may be produced by those of skill in the art without undue experimentation or further inventive contribution, and further details of their construction is not described herein. These individual components of the above described system have been commercially made and used in other broadband communication Systems such as LAN equipment compatible with the broadband specifications of IEEE 802.3 and 802.4, as well as in television set top converters and cable modems.

The expense and difficulty of installing a home personal computer network is significantly reduced with the invention because existing wiring in the residence is also utilized to support a LAN. This is accomplished by utilizing existing cable television wiring as LAN interconnecting cable. Implementation of such a system provides many advantages over the creation of a separate in-home computer network. In addition to the fact that installation is relatively inexpensive because the cable is already installed, the cable itself supports very high data rates and produces comparatively low levels of electromagnetic interference. Furthermore, the computers on the network are coupled to the cable television service and are therefore, able to receive all of the video or data services available from the cable television service provider.

The foregoing description details certain embodiments of the invention and describes the best mode contemplated. It will be appreciated, however, that no matter how detailed the foregoing appears in text, the invention can be practiced in many ways. For example, many different types of broadband LANs can be supported by cable television wiring which use different modulation and medium access control techniques. Furthermore, LANs which may not be classified as "broadband" may be used in the system of the present invention as long as the signal energy of the LAN communication can be confined to a selected portion of the available spectral bandwidth of the cable. It will also be appreciated that the specific carrier frequencies and communication frequency bands discussed above are currently preferable because of compatibility with certain standards and cable distribution systems currently developed. The invention, however, is not limited to these frequencies and frequency bands. In addition, although the system has been described in the context of the delivery of cable television to residential buildings, the invention is not limited to this environment, and may be utilized in any communication system where it is desirable to more efficiently use available bandwidth and/or to avoid the expense of installing additional LAN cabling. AS is also stated above, it should be noted that the use of particular terminology when describing certain features or aspects of the present invention should not be taken to imply that the broadest reasonable meaning of such terminology is not intended, or that the terminology is being re-defined herein to be restricted to including any specific characteristics of the features or aspects of the invention with which that terminology is associated.

The invention may be embodied in other specific forms without departing from its spirit or essential characteristics. The described embodiment is to be considered in all respects only as illustrative and not restrictive, and the scope of the invention is, therefore, indicated by the appended claims rather than by the foregoing description All changes which come within the meaning and range of equivalents of the claim, are to be embraced within their scope.

What is claimed is:

1. A method of communicating data between computing devices comprising:
   receiving a video signal from headend transmission equipment of a cable television transmission system;
   filtering out a portion of said video signal in the range of approximately 50 MHz to approximately 750 MHz to produce a filtered signal;
   coupling said filtered signal to unlooped cable television wiring;
   coupling a plurality of personal computers to said cable television wiring, wherein each of at least some of said personal computers comprises a receiver configured to receive video signals from said headend transmission equipment, a transmitter for forwarding signals to said headend transmission equipment, and a modem configured to receive and transmit broadband signals between said personal computers;
   communicating messages between different ones of said personal computers via said modem by modulating a carrier having a frequency within said filtered out portion; and
   forwarding signals from at least one of said personal computers to said cable television transmission system using a carrier frequency in the range of approximately 0 MHz to approximately 50 MHz.

2. The method of claim 1 wherein said filtering out act comprises attenuating a portion of said signal by at least 20 dB.

3. A method of making a local-area-network, said local-area-network comprising a first personal computer and a second personal computer, the method comprising:
   receiving a video signal from headend transmission equipment of a cable television distribution system, said video signal comprising a plurality of separate television broadcasts within the frequency range of approximately 50 MHz to 750 MHz;
   filtering out one or more of said television broadcasts of said video signal with a notch filter to produce a filtered signal;
   outputting said filtered signal to an unlooped cable;
   providing at least one of said first and second personal computers with a receiver configured to receive video signals from said headend transmission equipment, a transmitter for forwarding signals to said headend transmission equipment, and a modem configured to receive and transmit broadband signals between said first and second personal computers; and
   connecting said first personal computer and said second personal computer to said cable.

4. The method of claim 3 wherein said filtering act comprises filtering signal energy in a stop band from said video signal.

5. The method of claim 4, additionally comprising the act of communicating data via said modem from said first personal computer to said second personal computer in a frequency band within said stop band.

6. A local area network comprising:
   a notch filter configured to receive a video signal from a cable television transmission system and to filter out a portion of said video signal in the range of approximately 50 MHz to approximately 750 MHz to produce a filtered signal;
   an unlooped cable television wire configured to receive said filtered signal;
   a plurality of personal computers coupled to said wire, wherein at least some of said personal computers comprise a receiver configured to receive video signals from said cable television transmission system, a transmitter configured to forward signals to said cable television transmission system, and a modem configured to receive and transmit broadband signals between said personal computers;
   wherein said personal computers are configured to communicate messages between different ones of said personal computers via said modem by modulating a carrier having a frequency within said filtered out portion; and
   wherein at least one of said personal computers is configured to forward signals to said cable television transmission system using a carrier frequency in the range of approximately 0 MHz to approximately 50 MHz.

7. The local area network of claim 6, wherein said modem is configured to receive signals at a first frequency and to transmit signals at a second frequency.

8. The local area network of claim 7, further comprising a frequency converter configured to convert signals from said first frequency to said second frequency.

9. The local area network of claim 6, wherein said receiver is configured to receive digital data from the Internet.

10. The local area network of claim 6, wherein said receiver is configured to receive FM audio signals.

11. The local area network of claim 6, wherein at least one of said personal computers is configured to receive signals from said transmission system using a carrier frequency in the range of approximately 0 MHz to approximately 50 MHz.

12. A local area network comprising:
   means for receiving a video signal from a cable television transmission system;
   means for filtering out a portion of said video signal in the range of approximately 50 MHz to approximately 750 MHz to produce a filtered signal;
   an unlooped cable television wire configured to receive said filtered signal, wherein said wire is located in a residential building;

a plurality of personal computers coupled to said wire, wherein each of at least some of said personal computers comprises:
  means for receiving said filtered signal;
  means for forwarding signals to said cable television transmission system; and
  means for receiving and transmitting signals between different ones of said personal computers;
wherein said personal computers are configured to communicate via said modem by modulating a carrier having a frequency within said filtered out portion; and
wherein at least one of said personal computers is configured to forward signals to said cable television transmission system using a carrier frequency in the range of approximately 0 MHz to approximately 50 MHz.

13. The local area network of claim 12, wherein said means for receiving and transmitting signals between different ones of said personal computers is configured to receive signals at a first frequency and to transmit signals at a second frequency.

14. The local area network of claim 13, further comprising means for converting signals from said first frequency to said second frequency.

15. The local area network of claim 12, wherein said means for receiving said filtered signal comprises means for demodulating digital data from the Internet.

16. The local area network of claim 12, wherein said means for receiving said filtered signal comprises means for demodulating FM audio signals.

17. The local area network of claim 12, wherein at least one of said personal computers is configured to receive signals from said cable television transmission system using a carrier frequency in the range of approximately 0 MHz to approximately 50 MHz.

* * * * *

UNITED STATES PATENT AND TRADEMARK OFFICE
CERTIFICATE OF CORRECTION

PATENT NO. : 6,637,030 B1
DATED : October 21, 2003
INVENTOR(S) : Dean A. Klein

It is certified that error appears in the above-identified patent and that said Letters Patent is hereby corrected as shown below:

<u>Title page,</u>
Item [22], PCT Filed:, please change "June 10, 1997" to -- June 9, 1997 --.

Signed and Sealed this

Ninth Day of March, 2004

JON W. DUDAS
*Acting Director of the United States Patent and Trademark Office*